United States Patent
Pelosse (10) Patent No.: US 8,311,720 B2
(45) Date of Patent: Nov. 13, 2012

(54) LOST TARGET FUNCTION FOR ADAPTIVE CRUISE CONTROL

(75) Inventor: Jean-Francois Pelosse, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 12/684,340

(22) Filed: Jan. 8, 2010

(65) Prior Publication Data

US 2010/0179741 A1 Jul. 15, 2010

Related U.S. Application Data

(60) Provisional application No. 61/143,551, filed on Jan. 9, 2009.

(51) Int. Cl.
*B60W 30/16* (2012.01)

(52) U.S. Cl. ............. 701/96; 701/301; 701/36; 701/70; 180/170; 123/349

(58) Field of Classification Search ............... 701/96, 701/93, 98, 301, 36, 91, 70; 180/170; 123/349
See application file for complete search history.

(56) References Cited

U.S. PATENT DOCUMENTS

| | | | | |
|---|---|---|---|---|
| 4,622,636 | A | * | 11/1986 | Tachibana ...................... 701/96 |
| 5,678,650 | A | * | 10/1997 | Ishihara et al. ............... 180/169 |
| 5,955,941 | A | | 9/1999 | Pruksch et al. |
| 5,977,869 | A | | 11/1999 | Andreas |
| 6,081,762 | A | * | 6/2000 | Richardson et al. ............ 701/93 |
| 6,081,763 | A | | 6/2000 | Smith et al. |
| 6,154,168 | A | * | 11/2000 | Egawa et al. ................... 342/71 |
| 6,161,074 | A | * | 12/2000 | Sielagoski et al. .............. 701/96 |
| 6,233,515 | B1 | | 5/2001 | Engelman et al. |
| 6,233,516 | B1 | * | 5/2001 | Egawa ............................ 701/96 |
| 6,301,542 | B1 | | 10/2001 | Kirchberger et al. |
| 6,304,808 | B1 | | 10/2001 | Milot |

(Continued)

FOREIGN PATENT DOCUMENTS

EP    0899148    3/1999

OTHER PUBLICATIONS

Winner, Hermann, et al., "Adaptive Cruise Control System Aspects and Development Trends", SAE Technical Paper Series, 961010, The Engineering Society for Advancing Mobility Land Sea Air and Space International, International Congress & Exposition, Detroit, Michigan, Feb. 26-29, 1996.

(Continued)

*Primary Examiner* — Joseph Rocca
*Assistant Examiner* — Keith Frisby
(74) *Attorney, Agent, or Firm* — Michael Best & Friedrich LLP (57) ABSTRACT

An adaptive cruise control including a lost target function. The adaptive cruise control is operable in at least one of three modes: a normal mode, a following mode, and a lost target mode. In the normal mode, a user-set speed is maintained by the user vehicle. In the following mode, the adaptive cruise control detects a slower moving target vehicle and maintains a particular distance behind the target vehicle. In the lost target mode, the adaptive cruise control recognizes that a target vehicle is no longer detected and zeroes the acceleration of the user vehicle for a particular delay time. After expiration of the delay time, driver override, or detecting a target vehicle again, the cruise control exits the lost target mode.

14 Claims, 7 Drawing Sheets

U.S. PATENT DOCUMENTS

| | | |
|---|---|---|
| 6,311,117 B1 | 10/2001 | Winner et al. |
| 6,311,120 B1 | 10/2001 | Asada |
| 6,370,461 B1 | 4/2002 | Pierce et al. |
| 6,370,470 B1 | 4/2002 | Yamamura et al. |
| 6,430,494 B1 * | 8/2002 | Inoue et al. ............... 701/96 |
| 6,493,625 B2 | 12/2002 | Andreas et al. |
| 6,560,525 B1 | 5/2003 | Joyce et al. |
| 6,600,986 B2 * | 7/2003 | Steinle et al. ............. 701/70 |
| 6,618,664 B2 * | 9/2003 | Matsumoto et al. ........ 701/96 |
| 6,678,602 B2 | 1/2004 | Winner et al. |
| 6,708,099 B2 | 3/2004 | Tellis et al. |
| 6,708,100 B2 | 3/2004 | Russell et al. |
| 6,810,319 B2 | 10/2004 | Manaka |
| 6,985,805 B2 | 1/2006 | Sudou et al. |
| 7,363,155 B2 | 4/2008 | Meister et al. |
| 7,373,237 B2 | 5/2008 | Wagner et al. |
| 7,389,172 B2 | 6/2008 | Sugano |
| 7,904,228 B2 * | 3/2011 | Pfeiffer et al. ............ 701/96 |
| 7,933,709 B2 * | 4/2011 | Laiou et al. ............... 701/96 |
| 7,966,118 B2 * | 6/2011 | Kade ........................ 701/96 |
| 2002/0032514 A1 * | 3/2002 | Kuroda et al. ............. 701/96 |
| 2004/0193353 A1 | 9/2004 | Dunoyer et al. |
| 2007/0005218 A1 * | 1/2007 | Ueyama ..................... 701/96 |
| 2007/0093951 A1 | 4/2007 | Schroeder et al. |
| 2008/0147271 A1 | 6/2008 | Breed |
| 2009/0055069 A1 * | 2/2009 | Lindqvist et al. .......... 701/96 |
| 2009/0228184 A1 * | 9/2009 | Ueyama et al. ............ 701/96 |
| 2009/0268947 A1 | 10/2009 | Schaufler |

OTHER PUBLICATIONS

Hoess, Alfred, "Realisation of an Intelligent Cruise Control System Utilizing Classification of Distance, Relative Speed and Vehicle Speed Information", Intelligent Vehicles '94 Symposium, pp. 7-12, Oct. 24-26, 1994.

* cited by examiner

LOST TARGET FUNCTION FOR ADAPTIVE CRUISE CONTROL

BACKGROUND

The present invention relates to adaptive, cruise-control systems and cruise-control methods for vehicles.

Traditional cruise controls for vehicles control the speed of a vehicle at a user-set level. Once activated, if the vehicle speed is below the user-set level, the cruise control causes the vehicle to accelerate until the vehicle speed reaches the user-set level. If the vehicle is above the user-set level, the cruise control causes the vehicle to decelerate, whether by braking force or reducing the "throttle input," until the vehicle speed reaches the user-set level. The cruise control is activated by a user-interface control (e.g., one or more buttons or levers), which is, for example, mounted on or adjacent to the steering wheel. The user can enable and disable the cruise control, set the desired speed of the vehicle, or adjust the previously set speed using the user-interface. Additionally, depressing the brake pedal cancels the cruise control's control of vehicle speed. The cruise control can be reactivated by using the user-interface control.

SUMMARY

In one embodiment, the invention provides an adaptive cruise control system for a first or user vehicle. The system includes a target vehicle sensor operable to detect a second or target vehicle and an adaptive cruise control unit. The adaptive cruise control unit is coupled to the target vehicle sensor and includes a timer module. The adaptive cruise control unit is operable to control a velocity of the user vehicle in at least a normal mode, a following mode, and a lost target mode. In the normal mode, the adaptive cruise control unit is outputs signals to control the velocity of the user vehicle to maintain a user-set velocity. In the following mode, the adaptive cruise control unit outputs signals to control the velocity of a vehicle to maintain a particular distance from the target vehicle. In the lost target mode, which is entered when the adaptive cruise control unit no longer detects the target vehicle, the adaptive cruise control unit maintains a current velocity level for a delay time using the timer module.

In one embodiment, the invention provides an adaptive cruise control system for a first or user vehicle. The system includes a target vehicle sensor operable to detect a second or target vehicle and an adaptive cruise control unit. The adaptive cruise control unit is coupled to the target vehicle sensor and includes a timer module. The adaptive cruise control unit is operable to control a velocity of the user vehicle in at least a normal mode, a following mode, and a lost target mode. In the normal mode, the adaptive cruise control unit outputs signals to control the velocity of the user vehicle to maintain a user-set velocity. In the following mode, the adaptive cruise control unit outputs signals to control the velocity of a vehicle to maintain a particular distance from the target vehicle. In the lost target mode, which is entered when the adaptive cruise control unit no longer detects the target vehicle, the adaptive cruise control unit maintains a current velocity level for a delay time using the timer module.

In another embodiment, the invention provides an adaptive cruise control unit for a user vehicle. The adaptive cruise control unit includes a microcontroller, a speed module, a distance module, and a timer module. The speed module is operable to indicate to the microcontroller whether a velocity of the user vehicle is within a range of a user-set velocity. The distance module is operable to indicate to the microcontroller whether a distance between the user vehicle and the target vehicle is within a predetermined range. The timer module is operable to indicate to the microcontroller that a delay time has elapsed. The microcontroller is operable to detect a target vehicle and to determine that the target vehicle is no longer detected. In response to determining that the target vehicle is no longer detected, the microcontroller is operable to control the timer module to start a delay timer and maintain the velocity of the user vehicle at a current level. Upon receiving an indication that the delay time has elapsed from the timer module, the microcontroller is operable to adjust the velocity of the user vehicle to be within the range of the user-set velocity.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

An adaptive cruise control ("ACC") is, in a general sense, similar to a traditional cruise control, but uses additional sensing equipment to detect other objects, e.g., a target vehicle preceding the user's vehicle in the same lane. For instance, if a user sets a vehicle speed to 60 miles per hour ("mph") and, while proceeding at 60 mph under control of the ACC, the vehicle approaches a slower-moving, target vehicle in the same driving lane, the ACC causes the vehicle to slow down. The ACC uses throttle and brake controls to first reduce the speed of the user vehicle. Then, the ACC controls the speed of the user vehicle to maintain a particular distance between the user vehicle and the target vehicle. The particular distance is based on user selection, sensed weather conditions, sensed road conditions, and other factors. The ACC controls the speed of the user vehicle to be at the lesser of 1) the speed necessary to maintain the particular distance and 2) the user-set speed. If the user vehicle or target vehicle changes lanes or otherwise is no longer detected by the ACC, and no new target vehicle within the particular distance is detected, the ACC causes the vehicle to accelerate and then maintain the user-set speed.

Figure 1:
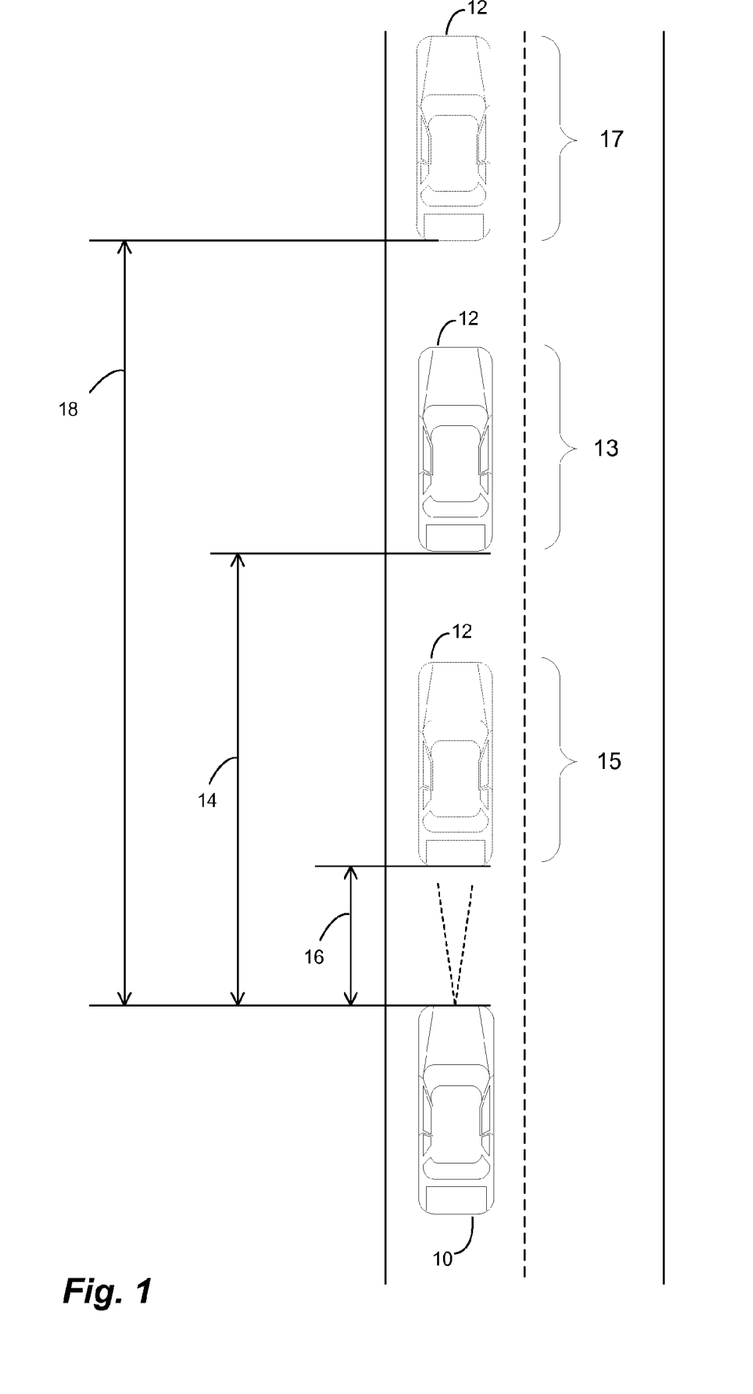
FIG. 1 illustrates a user vehicle with an adaptive cruise control according to embodiments of the invention and a target vehicle.
Figure 4:
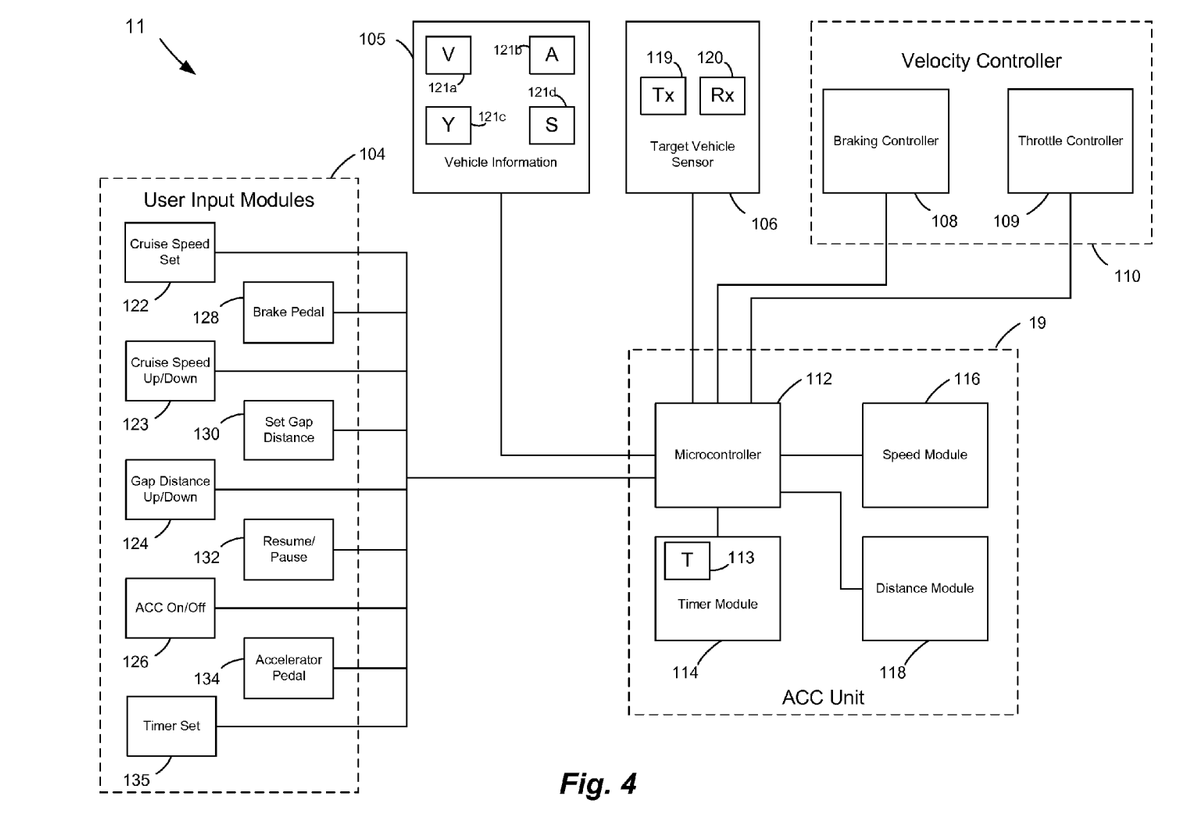
FIG. 4 depicts an adaptive cruise control system with lost target functionality according to embodiments of the invention.

FIG. 1 depicts a user vehicle 10 with an ACC system, such as ACC system 11 of FIG. 4. FIG. 1 also illustrates three potential positions of a target vehicle 12. In a first position 13, the distance between the target vehicle 12 and the user vehicle 10 is at a desired gap distance 14 set by the user. When the target vehicle is in front of the user vehicle 10 by the desired gap distance 14 (and the user vehicle 10 is at or below the set cruise speed), the ACC maintains the speed of the user vehicle 10. In a second position 15, the target vehicle is in front of the user vehicle 10 by a distance 16, which is less than the desired gap distance 14. When the target vehicle is in the second position 15, the ACC causes the user vehicle 10 to slow down until the desired gap distance 14 is reached (at the first position 13). In a third position 17, the target vehicle is in front of the user vehicle 10 by a distance 18, which is greater than the desired gap distance 14. When the target vehicle is in the third position 17, the ACC does not control the user vehicle 10 based on the target vehicle 12. In other words, the ACC controls the user vehicle 10 to achieve and maintain the set cruise speed (without regard to maintaining a set distance).

The ability for the ACC to control vehicle speed appropriately depends on the accuracy of the detection of the target vehicle. If a target vehicle is present, but not detected, the user vehicle will continue at its set cruise speed despite potentially encroaching on the target vehicle in an unsafe manner. Additionally, if the ACC does not detect a target vehicle leaving the user vehicle's path, the ACC will not resume normal cruise control operation (i.e., maintain the user vehicle at the set cruise speed).

As noted above, the ACC system 11 includes three modes: 1) a normal mode, 2) a following mode, and 3) a target lost mode. In the normal mode, the ACC system 11 controls the speed of the user vehicle to maintain the set cruise speed, as no target vehicle is currently being detected. In the following mode, the ACC system 11 is following a detected target vehicle at a desired gap distance as described above. In the target lost mode, as is described in greater detail below, the ACC system 11 zeros any acceleration and deceleration and maintains the current velocity. The user can override or cancel any of these modes by depressing the brake pedal or switching the ACC system 11 off using a user-interface control within the vehicle.

Figure 2A:
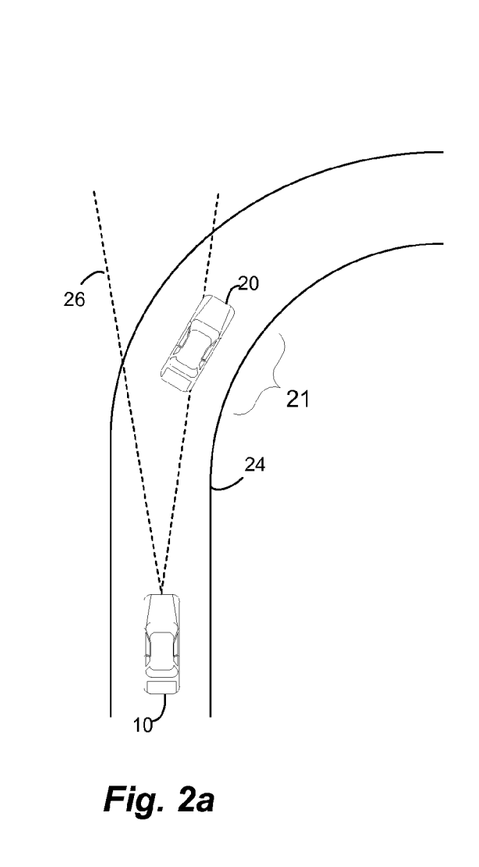
FIGS. 2a-c illustrate a user vehicle with an adaptive cruise control according to embodiments of the invention detecting, losing and re-detecting a target vehicle while traveling around a curve.
Figure 2B:
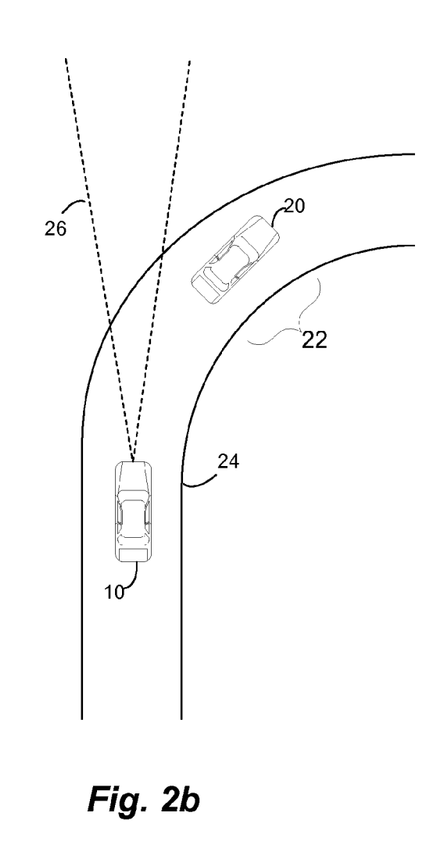
Figure 2C:
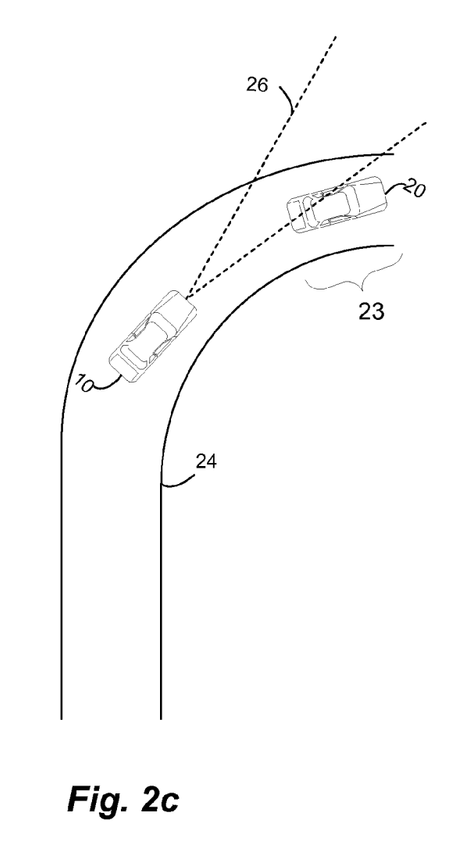

In some instances, the ACC system 11 will lose a target vehicle while in a following mode due to a curve or hill in the road or due to inaccuracy of a course prediction of the ACC system 11 (particularly during dynamic situations, like S-curves). For instance, as illustrated in FIGS. 2a-c, as a target vehicle 20 proceeds through a curve 24, the ACC system 11 loses the target vehicle 20. At the beginning of the curve 24 in FIG. 2a, the target vehicle 20 is in a position 21 and within a range 26 of the ACC system 11. As the target vehicle 20 proceeds through the curve 24 to a position 22 in FIG. 2b, the target vehicle 20 moves out of the range 26 of the ACC system 11. Thus, the ACC system 11 falsely determines that the target vehicle 20 is no longer in front of the user vehicle 10. As the target vehicle 20 proceeds further through the curve 24 to a position 23 in FIG. 2c, the target vehicle 20 is again within the range 26 of the ACC system 3.

Figure 3A:
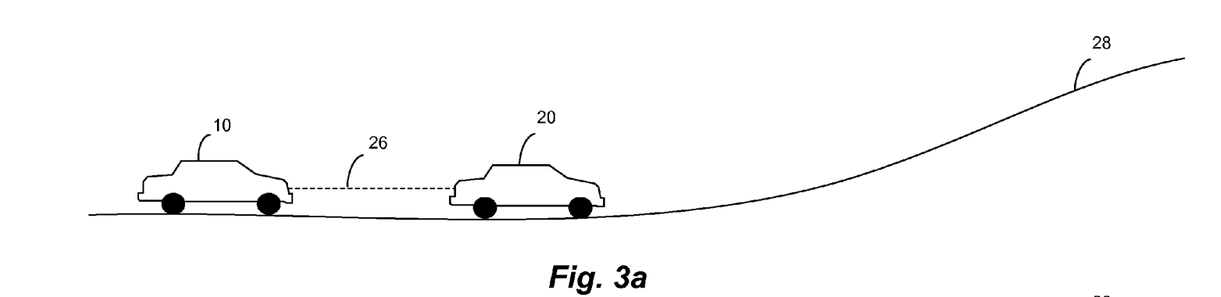
FIGS. 3a-c illustrate a user vehicle with an adaptive cruise control according to embodiments of the invention detecting, losing and re-detecting a target vehicle while traveling on a hill.
Figures 3B, 3C:
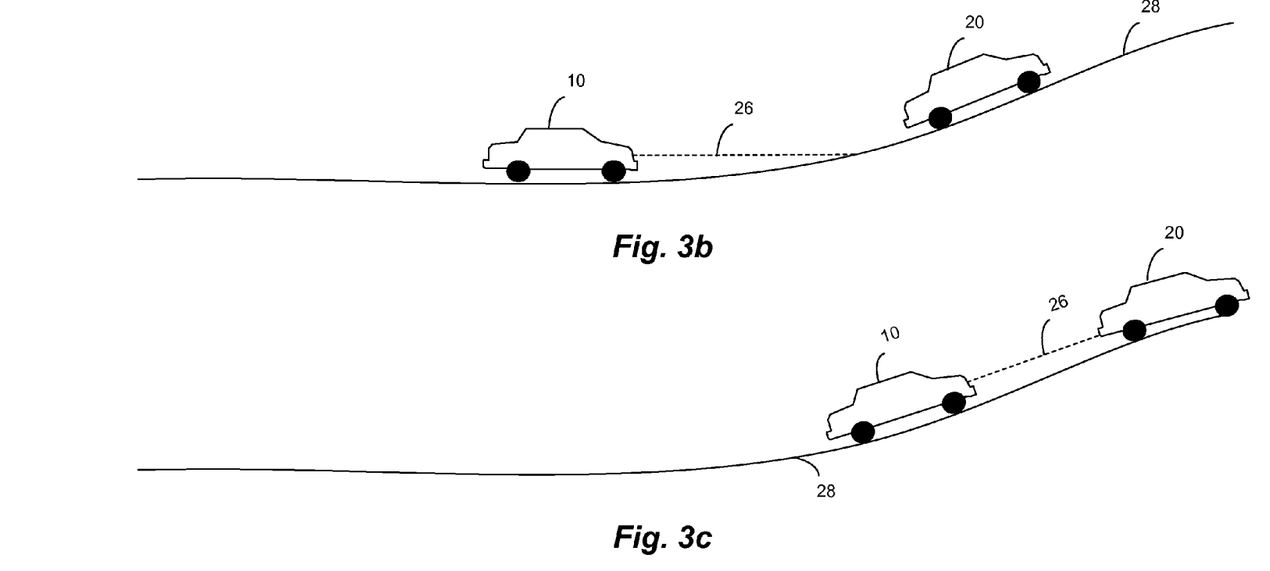

Similarly, as illustrated in FIGS. 3a-c, as a target vehicle 20 proceeds up a hill 28, the ACC system 11 of the user vehicle 10 loses the target vehicle 20 momentarily. In FIG. 3a, the target vehicle 20 is within the range 26 of the user vehicle 10 and is detected by the ACC system 11. In FIG. 3b, as the user vehicle 10 and target vehicle 20 proceed up the hill 28, the target vehicle 20 moves out of the range 26 of the ACC system 11. Thus, the ACC system 11 falsely determines that the target vehicle 20 is no longer in front of the user vehicle 10. As the target vehicle 20 proceeds further up the hill 28 in FIG. 3c, the target vehicle 20 is again within the range 26 of the ACC system 11.

If the ACC system 11 did not include a target lost mode, when the target vehicle 20 is lost (as illustrated in FIGS. 2b and 3b), the ACC system 11 would leave the following mode and return to the normal mode, causing the user vehicle 10 to accelerate towards the set cruise speed. Moments later, when the user vehicle 10 is again aligned with the target vehicle 20 (as illustrated in FIGS. 2c and 3c), the ACC system 11 would detect the target vehicle 20 and cause the user vehicle 10 to decelerate. This acceleration followed by a deceleration can cause an uncomfortable driving experience, an increase in fuel consumption, an undesired proximity to the target vehicle 20, and, as a consequence, a reduced usage of the ACC system 11 by a driver.

The lost target mode provided by the ACC system 11 helps to avoid the acceleration followed by a deceleration induced by a target vehicle that is momentarily lost by the ACC system 11. As will be described in greater detail below, the lost target mode uses a lost target timer to delay acceleration of the user vehicle for a particular amount of time after losing a target vehicle. The amount of time is chosen based on at least one of the actual time gap between the user vehicle and the target vehicle, the desired time gap between the user vehicle and the target vehicle, a preset time, the velocity of the user vehicle, and the relative velocity between the user vehicle and the target vehicle.

FIG. 4 depicts an ACC system 11 according to embodiments of the invention. The ACC system 11 includes an ACC unit 19, user input modules 104, a vehicle information module 105, a target vehicle sensor 106, a braking controller 108, and a throttle controller 109. The braking controller 108 and throttle controller 109 are part of a velocity controller 110 of the user vehicle. The ACC unit 19 includes a microcontroller 112, timer module 114, speed module 116, and distance module 118.

The target vehicle sensor 106 is positioned on a user vehicle such that it can detect a target vehicle in front of the user vehicle and outputs target vehicle information to the microcontroller 112. The target vehicle sensor 106 is a microwave radar sensor that uses a frequency-modulated, continuous wave ("FMCW") technique to sense objects. The target vehicle sensor 106 emits a FMCW signal using a transmitter 119 with an approximately 76.5 GHz frequency. The emitted wave is reflected off of a target vehicle, received by the target vehicle sensor 106 at receiver 120, and processed to provide a relative speed of the target vehicle, a distance between the vehicles, and a relative acceleration of the target vehicle. The signal processing of the reflected wave is performed within either the target vehicle sensor 106, the ACC unit 19 (e.g., the microcontroller 112), or a combination thereof.

The target vehicle sensor 106 also indicates a lateral position of the target vehicle or the target vehicle's angle relative to the user vehicle's longitudinal axis using, for instance, multi-beam techniques. This angular information is used to accurately select a target vehicle, for instance, when multiple potential target vehicles are detected. The target vehicle sensor 106 has an average output microwave power of less than 1 mW. In other embodiments, the target vehicle sensor 106 uses a different sensing technology, such as radar (radiowave-based), lidar (light-based), sonar (sound-based), a different FMCW implementation, or a combination thereof.

The microcontroller 112 also receives user vehicle status information from vehicle information module 105. Vehicle status information includes, for instance, the current vehicle speed, acceleration/deceleration rate, yaw rate, and steering angle, provided by a velocity sensor 121a, acceleration sensor 121b, yaw rate sensor 121c, and steering angle sensor 121d, respectively. The microcontroller 112 also receives information from the user input modules 104 including a cruise speed set module 122, cruise speed up/down module 123, gap distance up/down module 124, ACC on/off module 126, brake pedal module 128, set gap distance module 130, ACC resume/pause module 132, an accelerator pedal module 134, and a timer set module 135. In some embodiments, fewer or more user input modules 104 are included in the ACC system 11. For instance, in some embodiments, a timer set module 135 is not included.

In some embodiments, the ACC on/off module 126 is a switch or push-button on a user interface within the vehicle cab that is used to selectively enable and disable the ACC unit 19. The cruise speed set module 122 is used to select a cruise speed of the vehicle operating in the normal mode. The cruise speed up/down module 123 is used to increase and decrease a previously selected cruise speed. The set gap distance module is used to select a desired gap distance between the user vehicle and a target vehicle that the ACC system 11 will maintain while operating in the following mode. The gap distance up/down module 124 is used to increase and decrease a previously selected desired gap distance. The resume/pause module 132 is used to pause or resume the enabled ACC unit 19. The brake pedal module 128 and accelerator pedal module 134 monitor the user vehicle's brake and accelerator pedal and indicate to the microcontroller 112 the extent to which either is depressed by the driver.

The braking controller 108 receives braking signals from the microcontroller 112. In response to receiving braking signals, the braking controller 108 controls the user vehicle's braking system to output a braking force that slows the vehicle. The throttle controller 109 receives throttle input signals from the microcontroller 112. In response to receiving throttle input signals, the throttle controller 109 either controls the vehicle's engine to increase the vehicle speed or decrease the vehicle speed. In some embodiments, the throttle controller 109 or a separate transmission controller (not shown) is used in an automatic transmission vehicle to decrease the vehicle speed by down shifting.

The microcontroller 112 communicates with the timer module 114, speed module 116, and distance module 118 to share information between them and other components of the ACC system 11. The speed module 116 receives the current vehicle speed from the vehicle information module 105 and the set cruise speed from the user input modules 104. The speed module 116 determines and outputs to the microcontroller 112 an indication of whether the current vehicle speed is greater than the set cruise speed, less than the set cruise speed, or within an acceptable range of the set cruise speed (e.g., within 0.5 mph).

The distance module 118 receives the desired gap distance from the user input modules 104 and, if a target vehicle is detected, the current relative distance between the target vehicle and the user vehicle. The distance module 118 determines and outputs to the microcontroller 112 an indication of whether the current relative distance is greater than the desired gap distance, less than the desired gap distance, or within an acceptable range of the desired gap distance (e.g., within 0.5 meters).

The timer module 114 receives a lost target indication from the microcontroller 112 and includes lost target timer 113.

The lost target timer 113 starts counting upon receiving a lost target indication from microcontroller 112. In some embodiments, for instance, the lost target timer 113 counts up until a delay time has elapsed. In other embodiments, the lost target timer 113 is set with a delay time and counts down to zero.

Upon the delay time elapsing, the lost target timer 113 outputs a time elapsed indication to the microcontroller 112. In some embodiments, delay time is a fixed time. In other words, the delay time is fixed during the manufacturing process or during maintenance. For instance, the timer module 114 may store a value necessary for the lost target timer 113 to output a time elapsed indication after counting for two seconds. In other embodiments, a different predetermined time is used as the delay time, for instance, any value between 1 and 5 seconds.

In other embodiments, the delay time is variable and is set by the user via timer set module 135. For instance, in one embodiment, the lost target timer may be set to two seconds by default upon enabling the ACC unit 19. While the ACC unit 19 is enabled, the user may increase or decrease the delay time using the timer set module 135, for instance, using increment or decrement buttons. A maximum and minimum delay time is included such that, for instance, the delay time cannot be set below one second or above five seconds. Other embodiments use different maximum and minimum delay times and include other user interfaces for the user to specify delay times.

In other embodiments, the ACC system 11 automatically selects a delay time for a lost target timer 113 that is variable and based on at least one of the actual time gap between the user vehicle and the target vehicle, the desired time gap between the user vehicle and the target vehicle, the velocity of the user vehicle, and the relative velocity between the user vehicle and the target vehicle. For instance, in some embodiments the ACC system 11 sets the delay time to the result of the desired gap distance divided by the velocity of the user vehicle (i.e., the amount of time it takes the user vehicle to travel the desired gap distance). In other embodiments, the ACC system 11 sets the delay time to the result of the actual gap distance divided by the velocity of the user vehicle (i.e., the amount of time it takes the user vehicle to travel the actual gap distance between the user vehicle and target vehicle). In some embodiments, a supplemental offset is added or subtracted to the delay times that are based on the desired time gap or the actual time gap. For instance, the delay time is set to the desired time gap (or actual time gap) plus a percentage (e.g., 20%) of the desired time gap (or actual time gap).

In other embodiments, the delay time is set based on a function of the velocity of the user vehicle. For instance, the delay time may be set to 5% of the speed (in miles per hour), of the user vehicle, although other percentages and units of speed are used in other implementations. Other functions may start with a default delay time and add or subtract time based on the speed. An example function includes a default delay time of 2 seconds where 0.1 seconds is subtracted for every 5 miles per hour over 60 mph. Likewise, the function may start with a default delay time of 2 seconds and add 0.1 seconds for every 5 miles per hour under 60 mph. Thus, the delay time for a user vehicle traveling at 80 mph is set to 1.6 seconds (2 seconds−0.1*(80−60)/5), while the delay time for a user vehicle traveling 40 mph is set to 2.4 seconds (2 seconds+0.1*(80−60)/5). A longer delay time is desired for a slower moving user vehicle because it will take longer for that vehicle to reach the curve or hill or otherwise re-detect a falsely lost target vehicle.

In other embodiments, the delay time is set based on a function of the relative velocity of the user vehicle. For instance, the delay time may be lower if the relative velocity indicates that the user vehicle was closing in on the target vehicle at the moment it was lost. Likewise, the delay time may be higher if the relative velocity indicates that the user vehicle was getting farther away from the target vehicle at the moment it was lost. An exemplary function starts with a default delay time (e.g., two seconds) and adds or subtracts time based on the value of the relative velocity. Other embodiments use different functions to accomplish a similar goal.

The microcontroller 112 analyzes the outputs of the speed module 116, distance module 118, and timer module 114 to control the user vehicle using the braking controller 108 and throttle controller 109. Although shown separately in FIG. 4, various combinations of the speed module 116, timer module 114, distance module 118, braking controller 108, and throttle controller 109 may be included within the microcontroller 112. Furthermore, the ACC system 11 and its components may include hardware (e.g., an field programmable gate array or application specific integrated circuit), software, or a combination thereof.

Figure 5A:
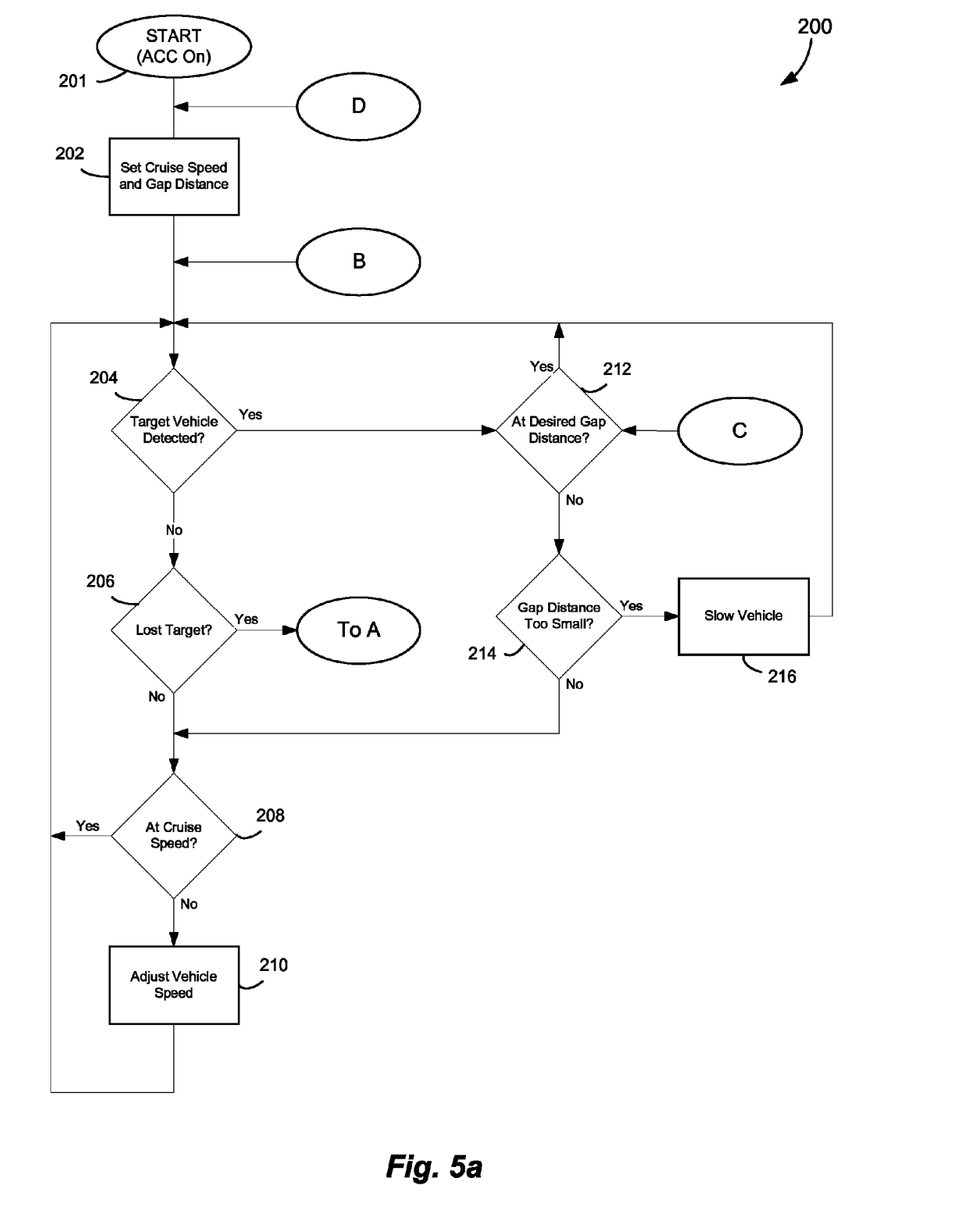
FIGS. 5a-b illustrate an adaptive cruise control method with lost target functionality according to embodiments of the invention.
Figure 5B:
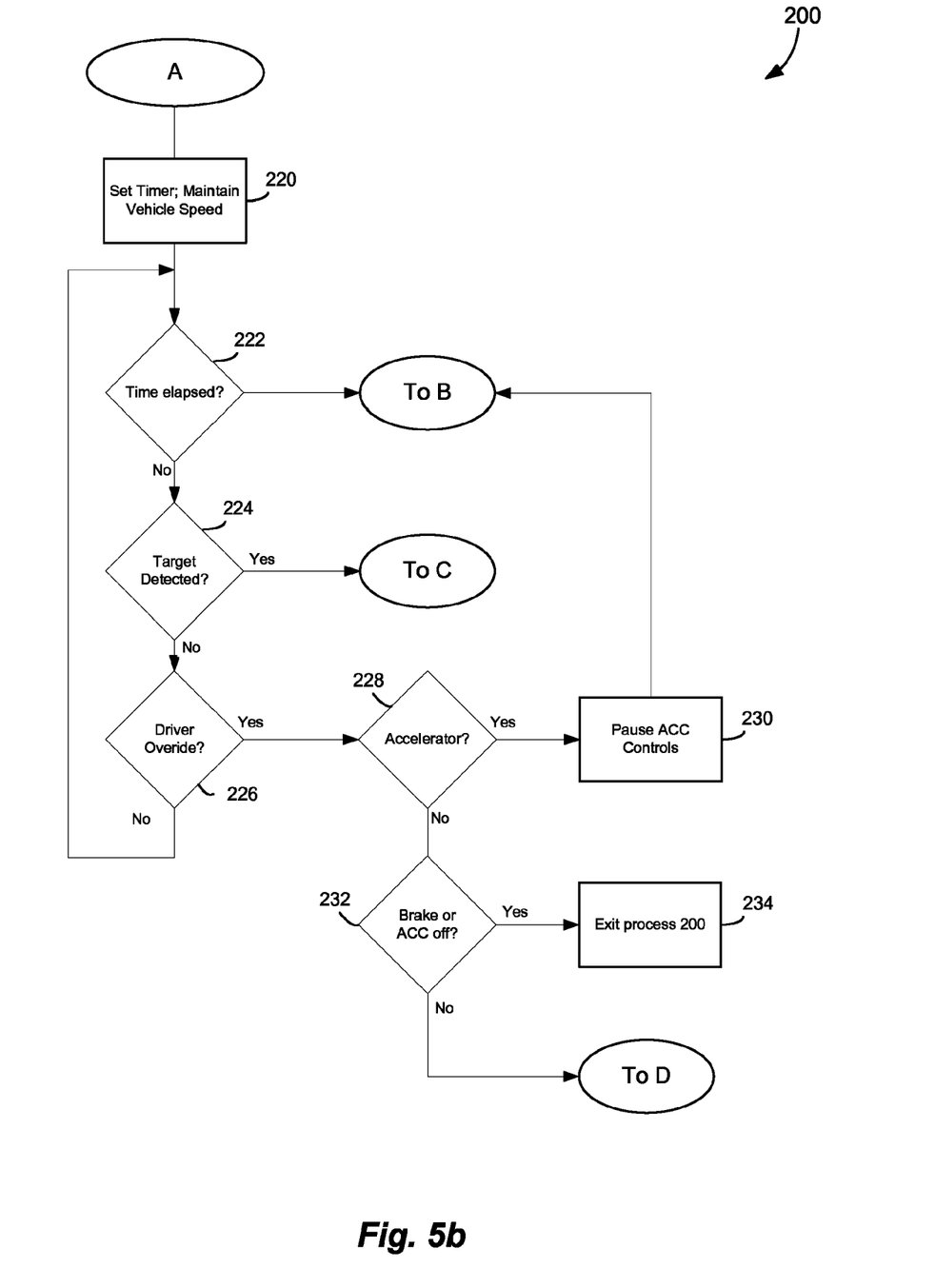

FIGS. 5a-5b illustrate an ACC method or process with the lost target mode. The process 200 of FIGS. 5a-5b begins upon enabling the ACC unit 19, for instance, using the ACC on/off module 126 (step 201). Thereafter, the cruise speed and desired gap distance are set by the user (step 202). In some embodiments, the desired gap distance is set to a default distance upon enabling the ACC unit 19. The set cruise speed and desired gap distance can be modified by the user throughout the process 200, for instance, using the set gap distance up/down module 130 and cruise speed up/down module 123.

After the cruise speed and desired gap distance are set, the microcontroller 112 determines whether the target vehicle sensor 106 detects a target vehicle (step 204). If no target vehicle is detected in step 204, the microcontroller 112 determines whether a target vehicle was recently lost in step 206 (i.e., a target vehicle was within a predetermined range the last time step 204 was executed, but is no longer present). In some embodiments, the predetermined range is the set gap distance. In other embodiments, the predetermined range is larger than the set gap distance.

In some embodiments, the microcontroller 112 is configured to calculate a confidence level for a detected target vehicle. For instance, if the microcontroller 112 detects a target vehicle based on a strong reflected signal from the target vehicle sensor 106, the microcontroller 112 determines a target vehicle is present and associates a high level of confidence with that determination (step 204). If the microcontroller 112 detects target vehicle based on a weak reflected signal, the microcontroller 112 determines a target vehicle is present and associates a low level of confidence with that determination (step 204). The microcontroller proceeds to operate in the following mode regardless of the confidence level associated with a detected target vehicle. However, when the microcontroller 112 loses a target vehicle that had an associated low confidence level (step 206), the microcontroller 112 will proceed to step 208 and return to the normal mode rather than the lost target mode in step 220.

If target tracking is maintained (i.e., there is no lost target in step 206), the microcontroller 112 determines whether the user vehicle is traveling at the set cruise speed based on communication from the speed module 116 (step 208). If the speed module 116 indicates that the current vehicle speed is within an acceptable range of the set cruise speed, the microcontroller proceeds back to step 204. If, however, the speed module 116 indicates that the current vehicle speed is too high or too low compared to the set cruise speed, the microcontroller proceeds to step 210.

In step 210, the microcontroller 112 analyzes the output from the speed module 116 to determine the appropriate commands to send to the braking controller 108 and throttle controller 109. In some embodiments, the aggressiveness or amount of acceleration commanded by the microcontroller alters the speed of the vehicle is a function of the difference between the set cruise speed and the current vehicle speed. For instance, if the set cruise speed is 60 mph and the current vehicle speed is 45 mph, the microcontroller 112 causes the vehicle to accelerate at a increased level relative to a situation where the set cruise speed is 60 mph and the current vehicle speed is 58 mph. However, a maximum acceleration and deceleration value is used to limit the effect of the acceleration and deceleration of the user vehicle. The microcontroller 112 may execute a number of iterations through process 200 to adjust the speed of the vehicle to the set cruise speed so that the acceleration process is relatively smooth.

If a target vehicle is detected in step 204, the microcontroller 112 determines if the actual gap distance between the target vehicle and the user vehicle is within a desired gap distance or desired range (step 212). If the actual gap distance is within the desired range, the microcontroller 112 returns to step 204. If the actual gap distance is not within the desired range, the microcontroller determines if the actual gap distance is too small in step 214. If the actual gap distance is too small, the microcontroller 112 slows the vehicle by outputting signals to either the braking controller 108, the throttle controller 109, or both (step 216). The microcontroller 112 uses the braking controller 108 to slow the vehicle in some instances, whether in step 210 or step 216, particularly for more aggressive decelerations. After slowing the vehicle in step 216, the microcontroller 112 returns to step 204 and the process is repeated. As a consequence, the desired gap distance between the user vehicle and target vehicle is maintained so long as the target vehicle is detected.

If the microcontroller 112 determines (in step 206) that a lost target situation has occurred, a lost target timer 113 is set and the user vehicle acceleration and deceleration is zeroed such that the vehicle maintains a constant speed (step 220, see FIG. 5b). Immediately thereafter, the lost target timer 113 begins to count and the user vehicle speed is maintained at a constant speed until a delay time elapses (step 222), a target vehicle is detected (step 224), or a driver override occurs (step 226). If the microcontroller 112 determines that the delay time has elapsed in step 222, the microcontroller proceeds to step 204 and acceleration and deceleration is no longer zeroed (i.e., the current velocity of the user vehicle is adjusted by the ACC unit 11 as determined in the normal mode). If the microcontroller 112 detects a target vehicle in step 224, the microcontroller proceeds to step 212 and, again, the acceleration and deceleration will no longer be zeroed. If the microcontroller 112 detects a driver override condition, the microcontroller 112 proceeds to step 228. If the driver depressed the vehicle accelerator pedal or paused the ACC system 11 using the resume/pause module 132, the microcontroller pauses all ACC system 11 control until the accelerator is no longer depressed or the driver reactivates the ACC system 11 using the resume/pause module 132 (step 230). If the driver depressed the brake, the process 200 is exited in step 234. If the brake was depressed and the process 200 exited, the process 200 will restart at step 201 by actuating the resume/pause module 132 or by setting the cruise speed using cruise speed set module 122. If the driver override was not due to the accelerator or brake, the microcontroller returns to step 202. Such non-acceleration and non-brake driver overrides include, for instance, driver input from cruise speed set module 122, cruise speed up/down module 123, set gap distance module 130, gap distance up/down module 124, and timer set module 135. In some embodiments, the ACC unit 19 proceeds back to step 222 if the driver override was not due to depressing the brakes, depressing the accelerator, or disabling the ACC unit 19.

A target vehicle flag or register (not shown) is used by the microcontroller to monitor the status of a target vehicle. For instance, the microcontroller 112 sets a target vehicle flag upon detecting a target vehicle within a predetermined range. Once the target vehicle is lost (i.e., the target vehicle is no longer within the predetermined range), the target vehicle flag is cleared. Thus, to determine whether a target vehicle is detected in step 204, the microcontroller 112 reads the target vehicle flag. Moreover, to determine if a target vehicle has recently been lost in step 206, the microcontroller 112 compares the current target vehicle flag value with the value that was present in the target vehicle flag during the previous execution of step 204. In some embodiments, the target vehicle flag is a one-bit, binary value stored in a memory.

Although driver override detection is only shown in step 226, driver override is monitored throughout the process 200 and, when detected, the microcontroller 112 determines if the driver is pressing the accelerator pedal in step 228. In addition, the ACC unit 19 is disabled and process 200 exited whenever the driver disables the ACC unit 19, for instance, by using the ACC on/off module 126 to turn the ACC unit 19 off.

Figure 6:
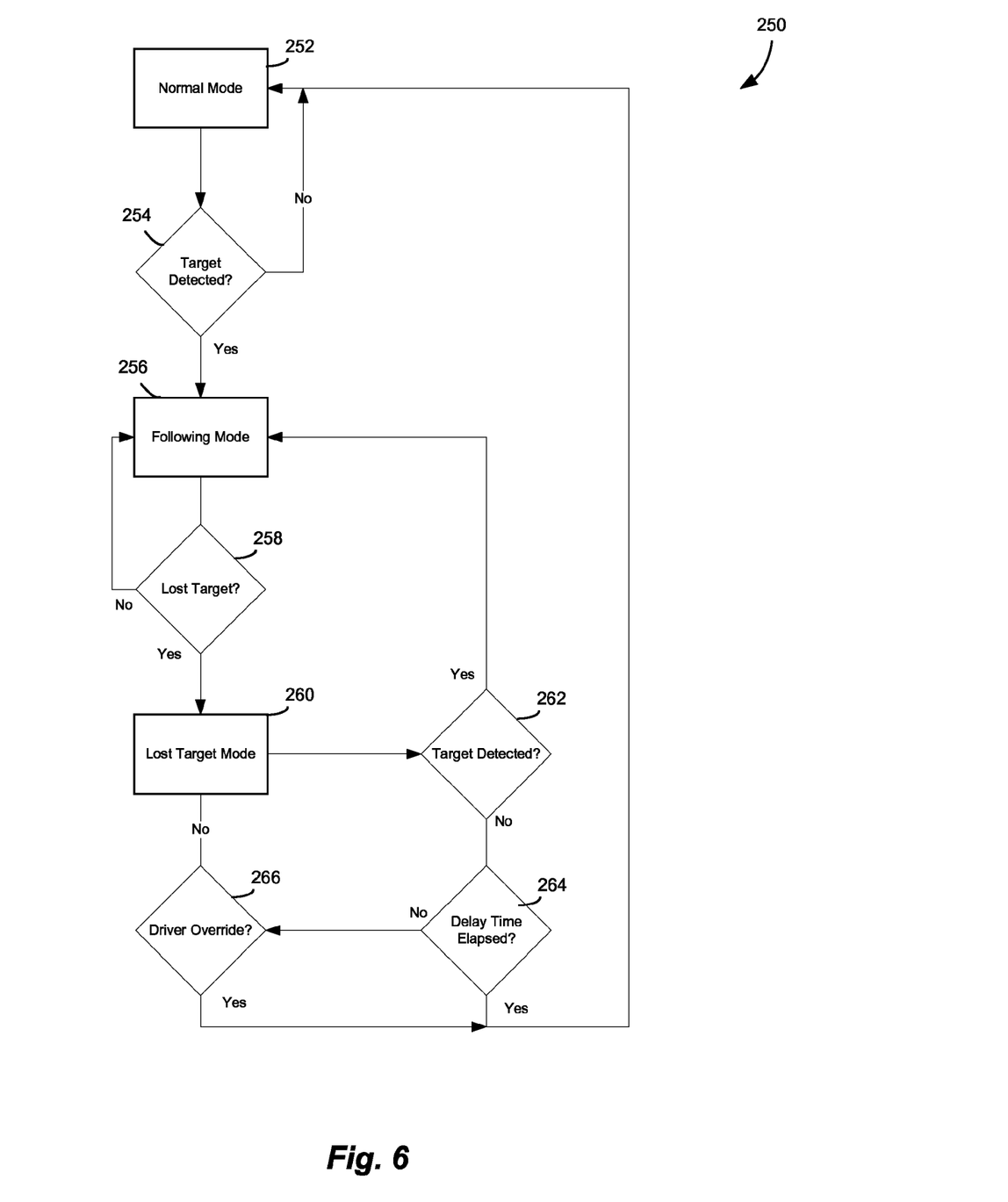
FIG. 6 illustrates an adjustable cruise control method according to embodiments of the invention.

FIG. 6 depicts an adjustable cruise control process 250, which is an alternative embodiment of the process 200. The process 250 begins with the adjustable cruise control (e.g., ACC unit 19) in the normal mode in step 252. In the normal mode, the ACC unit 19 maintains the user vehicle speed at the set cruise speed. If a target vehicle is detected in step 254, the ACC unit 19 switches to the following mode in step 256. In the following mode, the ACC unit 19 maintains the user vehicle at the desired gap distance from the detected target vehicle. If the ACC unit 19 ceases to detect the target vehicle (i.e., the ACC unit 19 determines a target vehicle has been lost), the ACC unit 19 enters the lost target mode 260.

In the lost target mode, the ACC unit 19 zeros the acceleration and deceleration of the user vehicle, maintaining the last measured velocity of the user vehicle. The ACC unit 19 remains in the lost target mode until one of a target vehicle is detected (step 262), the timer module 114 indicates the delay time has elapsed (step 264), or a driver override occurs (step 266). If a target vehicle is detected in step 262, the ACC unit 19 returns to the following mode (step 256). If the delay time elapses (step 264) or a driver override occurs (step 266), the ACC unit 19 returns to the normal mode (step 252). Potential driver override situations (which might cause step 266 to evaluate to true or yes) include the user depressing the accelerator or altering settings using the cruise speed set module 122, cruise speed up/down module 123, set gap distance module 130, gap distance up/down module 124, and timer set module 135. Driver override conditions caused by braking or disabling the ACC unit 19 cause the ACC unit 19 to exit the process 250 (which is not depicted in FIG. 6).

Thus, the invention provides, among other things, an adaptive cruise control system and method including a lost target function. The adaptive cruise control, upon detecting a lost target vehicle, maintains a current user vehicle velocity until at least one of 1) the delay time expires, 2) a target vehicle is detected, and 3) driver override of the adaptive cruise control system occurs. Various features and advantages of the invention are set forth in the following claims.

What is claimed is:

1. An adaptive cruise control system for a user vehicle, the system comprising:
    a timer set module, wherein the timer set module is operable to receive a value from a user within the user vehicle and, in response, to adjust the delay time based on the value;
    a target vehicle sensor operable to detect a target vehicle; and
    an adaptive cruise control unit coupled to the target vehicle sensor and including a timer module
    wherein the adaptive cruise control unit is operable to control a velocity of the user vehicle in at least a normal mode, a following mode, and a lost target mode, and
    in the normal mode, the adaptive cruise control unit outputs signals to control the velocity of the user vehicle to maintain a user-set velocity,
    in the following mode, the adaptive cruise control unit outputs signals to control the velocity of the user vehicle to maintain a particular distance from the target vehicle, and
    in the lost target mode, which is entered upon the adaptive cruise control unit no longer detecting the target vehicle, the adaptive cruise control unit maintains a current velocity level for the delay time using the timer module.

2. The adaptive cruise control system of claim 1, wherein the delay time is variable within, but not outside of, a predetermined maximum value and a predetermined minimum value.

3. The adaptive cruise control system of claim 1, wherein, before the delay time has elapsed, the adaptive cruise control unit is operable to exit the lost target mode and return to the following mode upon at least one of detecting the target vehicle and detecting a new target vehicle.

4. The adaptive cruise control system of claim 1, wherein the value includes at least one of an increment value and a decrement value.

5. An adaptive cruise control method for vehicles, the method comprising:
    receiving a value from a user within a user vehicle at a timer set module and, in response, adjusting a delay time based on the value;
    outputting control signals to a velocity controller to maintain the user vehicle at a set velocity in a first mode of an adaptive cruise control;
    detecting a target vehicle and, in response, switching the adaptive cruise control from the first mode to a second mode;
    outputting control signals to the velocity controller to maintain the user vehicle at a set distance from the target vehicle in the second mode of the adaptive cruise control;
    ceasing to detect the target vehicle and, in response, switching the adaptive cruise control from the second mode to a third mode;
    setting a lost target timer with the delay time;
    outputting control signals to the velocity controller to maintain a current velocity of the user vehicle until the lost target timer indicates that the delay time elapsed.

6. The adaptive cruise control method of claim 5, wherein the value includes one of an increment value and a decrement value.

7. The adaptive cruise control method of claim 5, further comprising setting the delay time based on a time gap between the target vehicle and the user vehicle, the time gap based on a distance between the target vehicle and the user vehicle and a velocity of the user vehicle.

8. The adaptive cruise control method of claim 5, wherein the delay time is adjustable by the user using the timer set module within, but not outside of, a predetermined maximum value and a predetermined minimum value.

9. The adaptive cruise control method of claim 5, further comprising setting the delay time based on at least one of the current velocity of the user vehicle and a relative velocity between the target vehicle and the user vehicle.

10. The adaptive cruise control method of claim 5, further comprising switching, from the third mode to the second mode, before the delay time has elapsed upon at least one of detecting the target vehicle and detecting a new target vehicle.

11. An adaptive cruise control unit for a user vehicle comprising:
   a microcontroller operable to detect a target vehicle;
   a timer set module operable to receive a value from a user within the user vehicle and wherein the microcontroller is operable to adjust the delay time based on the value;
   a speed module operable to indicate to the microcontroller whether a velocity of the user vehicle is within a range of a user-set velocity;
   a distance module operable to indicate to the microcontroller whether a distance between the user vehicle and the target vehicle is within a predetermined range; and
   a timer module operable to indicate to the microcontroller that the delay time has elapsed;
   wherein the microcontroller is operable to determine that the target vehicle is no longer detected, in response to determining the target vehicle is no longer detected, control the timer module to start the delay timer and maintain the velocity of the user vehicle at a current level;
   upon receiving an indication that the delay time has elapsed from the timer module, adjust the velocity of the user vehicle to be within the range of the user-set velocity.

12. The adaptive cruise control unit of claim 11, wherein the adaptive cruise control unit is coupled to:
   a vehicle information module operable to detect the velocity of the user vehicle and output the velocity to the adaptive cruise control unit;
   a target vehicle sensor operable to detect a presence of the target vehicle and output target vehicle information to the adaptive cruise control unit; and
   a velocity controller operable to control the velocity of the user vehicle based on control signals received from the adaptive cruise control unit.

13. The adaptive cruise control unit of claim 12, wherein the microcontroller is operable to control the velocity of the user vehicle in a normal mode, a following mode, and a lost target mode, wherein, in the normal mode, the microcontroller is operable to maintain the velocity of the user vehicle within the range of the user-set velocity based on indications from the speed module; wherein, in the following mode, the microcontroller is operable to maintain the user vehicle at a predetermined distance from the target vehicle based on indications from the distance module; and wherein the microcontroller is operable to enter the lost target mode upon determining that the target vehicle is lost based on the target vehicle information and remain in the lost target mode until receiving the indication that the delay time has elapsed from the timer module.

14. The adaptive cruise control unit of claim 11, wherein the delay time is set between one and five seconds.

* * * * *